United States Patent
Schuber et al.

(10) Patent No.: US 12,338,392 B2
(45) Date of Patent: Jun. 24, 2025

(54) COMPOSITIONS AND METHODS FOR IRON CHELATION

(71) Applicant: Solugen, Inc., Houston, TX (US)

(72) Inventors: Paul Schuber, Sugar Land, TX (US); Jun Su An, Houston, TX (US); Thomas A. Swanson, Houston, TX (US); Jason Helander, Richmond, TX (US); Kevin Loftis, Conroe, TX (US); Gaurab Chakrabarti, Houston, TX (US); Sean Hunt, Houston, TX (US); Chris Arceo, Richmond, TX (US)

(73) Assignee: SOLUGEN, INC., Houston, TX (US)

(*) Notice: Subject to any disclaimer, the term of this patent is extended or adjusted under 35 U.S.C. 154(b) by 0 days.

(21) Appl. No.: 17/926,446

(22) PCT Filed: Jun. 14, 2021

(86) PCT No.: PCT/US2021/037250
§ 371 (c)(1),
(2) Date: Nov. 18, 2022

(87) PCT Pub. No.: WO2021/253006
PCT Pub. Date: Dec. 16, 2021

(65) Prior Publication Data
US 2023/0183553 A1 Jun. 15, 2023

Related U.S. Application Data

(60) Provisional application No. 63/038,510, filed on Jun. 12, 2020.

(51) Int. Cl.
*C09K 8/532* (2006.01)
*C09K 8/035* (2006.01)
*C09K 8/584* (2006.01)
*C09K 8/60* (2006.01)
*C09K 8/86* (2006.01)

(52) U.S. Cl.
CPC .............. *C09K 8/532* (2013.01); *C09K 8/035* (2013.01); *C09K 8/584* (2013.01); *C09K 8/602* (2013.01); *C09K 8/86* (2013.01)

(58) Field of Classification Search
CPC ........ C09K 8/528; C09K 8/532; C09K 8/035; C09K 8/584; C09K 8/602; C09K 8/86; C09K 8/206; Y10S 507/932
See application file for complete search history.

(56) References Cited

U.S. PATENT DOCUMENTS

| | | |
|---|---|---|
| 6,103,686 A | 8/2000 | Asakawa et al. |
| 2001/0011645 A1 | 8/2001 | Silva et al. |
| 2011/0165610 A1 | 7/2011 | Baker |
| 2012/0295986 A1 | 11/2012 | Smith et al. |
| 2014/0303047 A1 | 10/2014 | McDaniel et al. |
| 2018/0148632 A1* | 5/2018 | Bennett .................. C23G 1/061 |

OTHER PUBLICATIONS

"Polymer/lignin blends: Interactions, properties, applications", Dávid Kun, Béla Pukánszky, European Polymer Journal, 2017, p. 618-641. (Year: 2017).*
PCT/US2021/037250 International Search Report and Written Opinion dated Sep. 15, 2021 (18 p.).
DOW Microbial Control: AQUCAR™ THPS 75 Water Treatment Microbiocide Antimicrobial for Industrial Water Treatment Applications (4 p.).
Berner, Robert A., "Iron Sulfides Formed from Aqueous Solution at Low Temperatures and Atmospheric Pressure," the Journal of Geology, vol. 72, No. 3, May 1964, pp. 293-306 (3 p.).
Andritsos, Nikolaos et al., "An Experimental Study of Sulfide Scale Formation in Pipes," Materials Science, 2004 (https://www.geothermal-energy.org/pdf/IGAstandard/WGC/1995/4-Andritsos.pdf) (6 p.).
Claassen, E.J., "Iron Sulfide as a Water-Deposited Scale in Sour Gas Wells," National Association of Corrosion Engineers Meeting, St. Louis, MO, Mar. 21-25, 1988 (https://www.osti.gov/biblio/5628039) (16 p.).
Przybylinski, John L. et al., "Iron Sulfide Scale Deposit Formation and Prevention under Anaerobic Conditions Typically Found in the Oil Field," 2001 SPE International Symposium on Oilfield Chemistry, Houston, Texas, Feb. 13-16, 2001 (SPE 65030) (8 p.).
Talbot, Robert E. et al., "TetrakisHydroxymethylPhosphonium Sulfate (THPS) for Dissolving Iron Sulfides Downhole and Topsides—A Study of the Chemistry Influencing Dissolution," Corrosion 2002, Paper No. 02030, Denver, CO. Apr. 2002 (14 p.).
DOW Product Safety Assessment: AQUCAR™ THPS 75 Water Treatment Microbiocide, Jul. 26, 2010 (7 p.).
Zheng, Yongui et al., "Mechanistic Study of the Effect of Iron Sulfide Layers on Hydrogen Sulfide Corrosion of Carbon Steel," NACE International Corrosion Conference Series, Paper No. 5933, Dallas, TX, Mar. 2015 (20 p.).

* cited by examiner

*Primary Examiner* — Aiqun Li
(74) *Attorney, Agent, or Firm* — CONLEY ROSE, P.C.

(57) ABSTRACT

A composition for efficient metal chelation includes (i) a primary chelant; (ii) a coordination enhancing additive; and (iii) a solvent. A wellbore servicing fluid includes (i) a primary chelant; (ii) a coordination enhancing additive; and (iii) a solvent.

22 Claims, No Drawings

COMPOSITIONS AND METHODS FOR IRON CHELATION

CROSS-REFERENCE TO RELATED APPLICATIONS

This application is a 35 U.S.C. § 371 national stage application of PCT/US2021/037250 filed Jun. 14, 2021, and entitled "Compositions and Methods for Iron Chelation," which claims the benefit of U.S. provisional patent application Ser. No. 63/038,510 filed Jun. 12, 2020, and entitled "COMPOSITIONS AND METHODS FOR IRON CHELATION," each of which is hereby incorporated herein by reference in its entirety for all purposes.

FIELD

The present disclosure relates to compositions for cation chelation. More particularly, the present disclosure relates to bioactive chelants.

BACKGROUND

Large operational and corrosion-related expenditures present an economic challenge for oil and gas companies. These expenditures in most cases are related to the unwanted deposition of solids as binary scale (e.g., iron sulfide), which can accumulate on the inside of pipelines that carry mixtures of oil, water, and gas. The nature of these depositions can vary depending on a variety of operating parameters including: temperature, pH, flow velocity, and the type of cations present in the fluids.

One of the most commonly studied and abundant binary scales found in these types of systems is iron sulfide (FeS). Iron sulfide results from a reaction between iron ions (e.g., $Fe^{2+}$) in the water and hydrogen sulfide found dispersed throughout the pipeline. In small amounts, iron sulfide can enhance the performance of the corrosion inhibitor film in high pressure, high temperature environments and increase the robustness of the protective layer in the presence of asphaltenes. However, when a sufficient amount of iron sulfide is formed on the inner pipe surface, the protective layer can allow corrosive fluids to come in contact with the metal surface allowing for under deposit corrosion to occur.

Free-flowing iron sulfide deposits are also "oil wet" in nature and can interfere with operation equipment, decrease their efficiency, and stabilize emulsions due to their oil-wet properties. Not only can iron sulfide allow for production issues, but iron sulfide is also a safety concern due to its pyrophoric physical properties that may react with elemental oxygen.

SUMMARY

Disclosed herein is a composition for efficient metal chelation comprising (i) a primary chelant; (ii) a coordination enhancing additive; and (iii) a solvent.

Also disclosed herein is a wellbore servicing fluid comprising (i) a primary chelant; (ii) a coordination enhancing additive; and (iii) a solvent.

DETAILED DESCRIPTION

As described above, sufficient amounts of iron sulfide in pipelines that carry mixtures of oil, water, and gas can be problematic. In many cases, iron sulfide can be remediated by mechanical cleaning or acid treatment. Both of these options have associated challenges due to the expense of mechanical cleaning and the safety concerns relating to the acid treatment. Furthermore, acid treatments are not specific towards iron sulfide and have the potential to cause severe tubular damage even in the presence of a corrosion inhibitor.

Current chemical practices for removal of sulfides in oil and gas applications typically utilize two types of compounds: (1) zinc-based compounds, and (2) iron-oxide (magnetite $Fe_3O_4$ or "ironite sponge")-based compounds. Both approaches suffer from drawbacks. For example, zinc-based compounds can cause detrimental effects to mud rheology and result in flocculation leading to fluid loss in oil and gas applications, while iron-based compounds are less effective at high pH.

Accordingly, an ongoing need exists for an environmentally-sound and sustainable chelants to effectively remove metal ions (e.g., iron) that contribute to the formation of corrosion-related metal species.

Disclosed herein are compositions and methods for the reduction of corrosion, and more specifically the reduction of corrosion mediated by a binary scaling material such as iron sulfide. Iron sulfide is used throughout this disclosure as being exemplary of a binary scale, however, it is contemplated that other forms of binary scale may be effectively mitigated by aspects of the compositions and methods disclosed herein. In an aspect, the present disclosure provides compositions and methods that when added to conventional corrosion-inhibiting formulations improve the efficacy of the formulation for iron chelation.

In other aspects, the present disclosure provides compositions and methods that in the absence of conventional corrosion inhibiting formulations allow for efficient metal (e.g., iron) chelation. In either aspect, the compositions disclosed herein function to provide efficient metal chelation, and thus, are hereinafter designated compositions for efficient metal chelation or "CEMC." In some aspects, the CEMCs of this disclosure are utilized in services related to the oil and gas industry, however, application of the CEMCs disclosed herein are not limited to the oil and gas industry. In an aspect, a CEMC comprises a primary chelant, a coordination enhancing additive, and a solvent.

In an aspect, a CEMC comprises a primary chelant. Herein, a primary chelant comprises any molecule that forms two or more separate coordinate bonds between a polydentate (multiple bonded) ligand and a single central atom (e.g., metal). Additionally, a primary chelant suitable for use in the present disclosure comprises a material capable of effectively chelating a metal cation in the monovalent, divalent or trivalent oxidation state; or a combination thereof.

In an aspect, the primary chelant is able to form a complex with a ferrous ion that has a log of the formation constant $K_f$ of equal to or greater than about 14. The formation constant, $K_f$, is a measure of the propensity of a substance to form from its component parts. In other words, the higher the log $K_f$, the more likely the product is to form.

A primary chelant suitable for use in the present disclosure would effectively complex with a metal (e.g., iron). In one or more aspects, the chelant can also sequester other common monovalent, divalent, and trivalent cations that may be encountered during oil and gas industrial operations. Nonlimiting examples of other cations that may be encountered during oil and gas industrial operations include but are not limited to alkali metals, alkaline earth metals, calcium, magnesium, barium, potassium, strontium, boron, aluminum, cesium, beryllium, and sodium. In an aspect, the primary chelant is the anionic component of a salt.

In an aspect, the primary chelant is a biochelant that may be a naturally-occurring molecule or derived from a naturally-occurring molecule such as a monosaccharide or a polysaccharide. Nonlimiting examples of primary chelants suitable for use in the present disclosure include aldonic acid, uronic acid, aldaric acid, salts thereof, derivatives thereof, and combinations thereof.

In an aspect, the primary chelant comprises mixtures of carboxylic acids or metal salts derived from sugars. For example and without limitation, the primary chelant may comprise glucose, dextrose, fructose, sucrose, galactose, lactose, maltose, ribose, inositol, trehalose, xylose, the corresponding monosaccharides, disaccharides, and trisaccharides, derivatives thereof, or combinations thereof.

In one or more aspects, the primary chelant is obtained as a purified material with a purity of equal to or greater than about 90%, alternatively equal to or greater than about 95%, or alternatively equal to or greater than about 99%.

In an alternative aspect, the primary chelant comprises sodium gluconate, a glucarate, an oxidation product of sodium glucarate, gluconate, a salt thereof, a derivative thereof, or a combination thereof.

The primary chelant may be included in the CEMC in an amount ranging from about 1 weight percent (wt. %) to about 50 wt. %, alternatively from about 10 wt. % to about 25 wt. %, or alternatively from about 15 wt. % to about 20 wt. % based on based on the total weight of the CEMC. Herein, all weight percentages are based on the total weight of the composition being described unless specified otherwise.

In an aspect, a CEMC of the type disclosed herein comprises a material that enhances the metal coordinating abilities of the primary chelant. Hereinafter, such a material is termed a coordination enhancing additive. For example, a coordination enhancing additive may interact with the primary chelant before and/or after sequestration of a metal ion, and increase the stability of the chelant-metal ion interaction. In general, any material that enhances the coordinating abilities of the primary chelant and is compatible with the other components of the CEMC may be employed.

In an aspect, the coordination enhancing additive comprises carbodiimides, amines (primary, secondary, and/or tertiary), guanidines, sulfonates, hydroxyl (primary, secondary, and tertiary), hydroxy sulfonic acid, phenates, esters, amides, phosphorus acids, alkyl phenols, carboxylic acids, or a combination thereof. In some aspects, the coordinating enhancing additive is an anionic material that is included in the CEMC as a salt such as a complex with an alkali metal or alkaline earth metal. The coordination enhancing additive may be included in the CEMC in an amount ranging from about 1 wt. % to about 50 wt. %, alternatively from about 10 wt. % to about 25 wt. %, or alternatively from about 15 wt. % to about 20 wt. % based on the total weight of the composition.

In an aspect, the primary chelant and coordination enhancing additive may both be present in a reaction product that is utilized as a component of the CEMC. In an aspect, the combination of primary chelant and coordination enhancing additive is present in the reaction product of a metal-catalyzed or enzymatically-catalyzed oxidation of a sugar. Thus, a CEMC of the present disclosure may have a mixture of materials included in the composition where at least a portion of the mixture comprises a primary chelant and at least a portion of the mixture comprises the coordination enhancing additive. In such aspects, the combination of primary chelant and coordination enhancing additive can be derived from an enzymatic oxidation process or a metal oxidation process that utilizes sugar feedstocks. For example, in the catalyzed oxidation of sugar feedstocks (using an enzymatic catalyst or metal catalyst), under appropriate reaction conditions, the sugar feedstocks are converted to oxidation products such as gluconate, tartaric, glucaric, glyceric, glucuronic, 2-keto-D-gluconic acid, 5-keto-D-gluconic acid, oxalic, tartronic acid, glycolic, carbon monoxide, carbon dioxide, pentaric acid, arabinic acid, guluronic acid and glucarate anions with minor component species of n-keto-acids and $C_2$-$C_5$ diacids, as well as their corresponding alkali metal and alkaline earth metal salt compounds, derivatives thereof, or a combination thereof.

In an aspect, the CEMC further comprises a solvent such as an aqueous fluid. In one or more aspects, the solvent is water. In an alternative embodiment, the solvent is an organic compound. For example, the solvent may be a hydrocarbon such as xylene. In some aspects, the CEMC may be winterized with the use of an alcohol as a solvent. For example, the CEMC may be winterized by the inclusion of methanol, ethanol, isopropanol, ethylene glycol, propylene glycol, or a combination thereof in the composition. In an aspect, the solvent is present in an effective amount; alternatively, the solvent comprises the remainder of the CEMC when all other components of the CEMC are accounted for. Herein, an effective amount is an amount suitable to meet some user and/or process goals, such as a specific density, rheology, or the like.

In some aspects, the CEMC comprises an oxidizer. Examples of oxidizers suitable for use in the present disclosure include but are not limited to hydrogen peroxide, peracetic acid, chlorine dioxide, perpropionic acid, sodium hypochlorite, and a combination thereof. Oxidizers, when present, may be included in amounts ranging from about 1 wt. % to about 50 wt. %, alternatively from about 1 wt. % to about 34 wt. %, alternatively from about 25 wt. % to about 50 wt. % or, alternatively from about 1 wt. % to about 8 wt. % based on the total weight of the CEMC.

In one or more aspects of the present disclosure, the CEMC comprises a surfactant. Surfactants suitable for use in the present disclosure include, for example and without limitation, a surfactant comprising an alkyl glucoside, a quaternary alkyl ammonium chloride, an alkyl phosphonium chloride, or a combination thereof.

In one or more aspects, the surfactant may comprise one or more zwitterionic surfactants, cationic surfactants, anionic surfactants, non-ionic surfactants, alkyl amine oxides, alkyl betaines, alkyl amidopropyl betaine, alkyl sulfobetaines, alkyl sultaines, dihydroxyl alkyl glycinate, alkyl ampho acetate, phospholipids, alkyl aminopropionic acids, alkyl imino monopropionic acids, alkyl imino dipropionic acids, laurylamidopropyl betaine, decyl betaine, dodecyl betaine, lecithin, phosphatidyl choline, stearyltrimethylammonium chloride, cetyltrimethylammonium tosylate, cetyltrimethylammonium chloride, cetyltrimethylammonium bromide, myristyltrimethylammonium chloride, myristyltrimethylammonium bromide, dodecyltrimethylammonium chloride, dodecyltrimethylammonium bromide, decyltrimethylammonium chloride, decyltrimethylammonium bromide, octyltrimethylammonium chloride, erucyl bis-(hydroxy ethyl)methylammonium chloride, erucyltrimethylammonium chloride, sodium oleate, sodium stearate, sodium dodecylbenzenesulfonate, sodium myristate, sodium laurate, sodium decanoate, sodium caprylate, sodium cetyl sulfate, sodium myristyl sulfate, sodium lauryl sulfate, sodium decyl sulfate, sodium octyl sulfate, linear alcohol ethoxylates, polyoxyethylene alkylphenol ethoxylates, polyoxyethylene alcohol ethoxylates, polyoxyethylene esters of fatty acids, polyoxyethylene mercaptans, polyoxyethylene alkylamines, polyol ester surfactants, or a combination thereof.

In an aspect the nonionic surfactant may be present in the CEMC in amounts ranging from about 0.2 wt. % to about 10 wt. %, alternatively from about 0.2 wt. % to about 1 wt. %, alternatively from about 1 wt. % to about 5 wt. % or alternatively from about 5 wt. % to about 10 wt. % based on the total weight of the CEMC.

In an aspect, the CEMC comprises from about 0.1 wt % to about 99.0 wt %, alternatively from about 1 wt. % to about 50 wt. %, or alternatively from about 10 wt. % to about 30 wt. % of a conventional mixture for corrosion inhibitor (e.g., comprising tetrakis-hydroxymethyl phosphonium sulfate); and from about 0.1% to 99.0 wt %, alternatively from about 1 wt. % to about 50 wt. %, or alternatively from about 10 wt. % to about 30 wt. % of a primary chelant. For example, the primary chelant may comprise a complex glucose or gluconic acid oxidation product buffered to a pH of 2.6-5.8 with sodium hydroxide that consists of a mixture of gluconic acid and glucaric acid with minor component species of n-keto-acids and $C_2$-$C_5$ diacids. In an aspect, a CEMC suitable for use in the present disclosure comprises water, a mixture of gluconic acid and glucaric acid with minor component species of n-keto-acids and $C_2$-$C_5$ diacids, and citric acid. In another aspect, a CEMC suitable for use in the present disclosure comprises water, a mixture of gluconic acid and glucaric acid with minor component species of n-keto-acids such as $C_2$-$C_5$ diacids, an oxidizer (e.g., hydrogen peroxide), and citric acid.

A CEMC of the type disclosed herein may be used as a component of a fluid that facilitates an operation or process in the oil and gas industry. For example, the CEMC may be a component of a drilling fluid, a workover fluid, a stimulation fluid, or a completion fluid. In an alternative aspect, the CEMC is included a fluid used for operations such as drilling, completing, stimulating, production (e.g., producing from production wells), injection (e.g., injecting into injection wells), and in enhanced oil recovery.

Disclosed herein are environmentally friendly compositions (i.e., CEMCs) that function to provide efficient metal chelation. For example, the compositions disclosed herein may rapidly and effectively chelate monovalent ions, divalent ions, or trivalent ions. In an aspect, a CEMC of the type disclosed herein chelates ferrous ion, alternatively ferric ion. A CEMC of the type disclosed herein, upon chelation of one or more metal ions functions to inhibit scale, such as calcium scale. The presently disclosed compositions utilize a mixture of bioactive chelates that can sequester iron to provide a green alternative, safely enhancing performance and delivering cost savings to operators.

EXAMPLES

The presently disclosed subject matter having been generally described, the following examples are given as particular aspects of the subject matter and to demonstrate the practice and advantages thereof. It is understood that the examples are given by way of illustration and are not intended to limit the specification or the claims in any manner.

Example 1

The effectiveness of CEMCs of the type disclosed herein as an iron chelation agent was investigated. Samples were prepared to contain the following additives; 10% liquid gluconate (PRODUCT 1), 50% of citric acid (PRODUCT 2), 5% liquid gluconate (PRODUCT 3), 25% of liquid gluconate and 25% of citric acid (PRODUCT 4), 1% of liquid gluconate (PRODUCT 5), 50% of liquid gluconate (PRODUCT 6). This is detailed in Table 1.

TABLE 1

| PRODUCT | LIQUID GLUCONATE (1 WT. %) | CITRIC ACID (2 WT. %) | SOLVENT (WT. %) |
|---|---|---|---|
| PRODUCT 1 | 10 | 0 | 90 |
| PRODUCT 2 | 0 | 50 | 50 |
| PRODUCT 3 | 5 | 0 | 95 |
| PRODUCT 4 | 25 | 25 | 50 |
| PRODUCT 5 | 1 | 0 | 99 |
| PRODUCT 6 | 50 | 0 | 50 |

Each sample was filtered through a 2 μm filter into a 50 mL jar and capped. 20 g of deionized water (DI) water was added to a dry 250 mL beaker followed by the amount of compound to be tested in the experiment. To the DI water, 1 mL of sodium sulfide octahydrate (3% weight in 97% $H_2O$) was added followed by 2.56 mL of 0.1 M $FeCl_3$. The beaker was then swirled for 5 minutes, the solution turned a dark black and the product was dosed. The beaker was swirled for an additional 5 minutes at which point the beaker was left to sit for 12 hours at room temperature. After 12 hours, the pH of the solution was raised to approximately 8 with 2 N NaOH and left to settle for an additional 12 hours followed by filtration through a 2 μm filter. These samples were then analyzed by inductively-coupled plasma (ICP) spectroscopy to determine the total amount of iron chelated. Table 2 provides the results of the water analysis of ICP spectroscopy at pH 5, in mg/L.

TABLE 2

| PRODUCT | Fe (mg/L) | Fe remaining in solution (%) |
|---|---|---|
| PRODUCT 1 | <1 | <0.3 |
| PRODUCT 2 | <1 | <0.3 |
| PRODUCT 3 | <1 | <0.3 |
| PRODUCT 4 | 19.1 | 6.9 |
| PRODUCT 5 | <1 | <0.3 |
| PRODUCT 6 | <1 | <0.3 |

ICP spectroscopic analysis determined that 1% of liquid gluconate (PRODUCT 5), 10% liquid gluconate (PRODUCT 1) and up to 50% liquid gluconate (PRODUCT 6) didn't effectively chelate iron. This was also observed with 50% of citric acid (PRODUCT 2). However, a combination of liquid gluconate and citric acid (PRODUCT 4) resulted in a boost of binding affinity for iron.

Example 2

Experiment: Iron (III) Chelation Performance Versus THPS

A solution of water with a known concentration of iron was prepared. Gluconate, gluconate—citric acid, and other chelating agents function to bring iron in solution, from an insoluble solid precipitate. As a result, an increase in iron concentration in water indicates relative chelation performance. The experiment was carried out as follows: a water solution with 275 mg/L iron was prepared and then dosed with SCAVSOL™ which is metal chelation product line commercially available from Solugen, Inc. of Houston, Texas.

The samples were then analyzed via ICP spectroscopy to measure iron concentration and the results are presented in Table 3 which gives the water analysis of ICP at pH 5, in mg/L.

TABLE 3

| ADDITIVE | ADDITIVE TOTAL ACTIVITY LEVEL [%] | ADDITIVE DOSAGE [GPTG] | FE IN SOLUTION [MG/L] | % FE IN SOLUTION (% CHELATED) |
|---|---|---|---|---|
| CONTROL - BLANK | 0 | 0.00 | ND (not detected) | 0.0 |
| THPS [TETRAKIS(HYDROXYMETHYL)PHOSPHONIUM CHLORIDE] | 50 | 0.25 | 255.2 | 92.8 |
| SODIUM GLUCONATE - GLUCONIC ACID | 30 | 0.25 | 265.4 | 96.5 |
| SODIUM GLUCONATE - GLUCONIC ACID | 50 | 0.25 | 273.7 | 99.5 |
| SODIUM GLUCONATE - GLUCONIC ACID - CITRIC ACID BLEND | 30 | 0.25 | 271.2 | 98.6 |

As seen from the results presented in Table 3, the gluconate blends outperformed the incumbent THPS product. Additionally, a synergistic effect can be seen with the addition of citric acid, as it chelated a higher amount of iron than the pure gluconate blend.

Example 3

The effect of an oxidizing agent on the performance of a CEMC of the type disclosed herein was investigated. A solution of produced water from a recycling facility was dosed with the CEMC designated PRODUCT 4 of Example 1. As seen in FIG. 1, testing combined PRODUCT 4 and 34% peroxide at difference concentrations as indicated on the bottles. In this case, 2000 ppm of PRODUCT 4 in the presence of 200 ppm of 34% hydrogen peroxide was observed to mitigate the iron sulfide deposition.

Example 4

The effectiveness of CEMCs of the type disclosed herein was investigated to determine performance as a calcium carbonate scale inhibitor. Samples were prepared to contain 20% lactic acid (PRODUCT 7), 20% citric acid (PRODUCT 8), 10% citric acid and 10% liquid gluconate (PRODUCT 9), and 10% lactic acid and 10% liquid gluconate (PRODUCT 10). The results are presented in Table 4.

TABLE 4

| PRODUCT | LIQUID GLUCONATE (WT %) | LACTIC ACID (WT %) | CITRIC ACID (WT %) | SOLVENT (WT %) |
|---|---|---|---|---|
| PRODUCT 7 | 0 | 20 | 0 | 80 |
| PRODUCT 8 | 0 | 0 | 20 | 80 |
| PRODUCT 9 | 10 | 0 | 10 | 80 |
| PRODUCT 10 | 10 | 10 | 0 | 80 |

The National Association of Corrosion Engineers (NACE) standard TM0374-2015 laboratory screening test was used to determine the ability of the products listed in Table 4 in preventing precipitation of calcium carbonate scale. A calcium-containing brine and a bicarbonate-containing brine were made with deionized water. The calcium-containing brine consisted of 12.15 g/L $CaCl_2 \cdot 2H_2O$ (ACS Reagent grade), 3.68 g/L $MgCl_2 \cdot 6H_2O$ (ACS Reagent grade), and 33.0 g/L NaCl (ACS Reagent grade). The bicarbonate-containing brine consisted of 7.36 g/L $NaHCO_3$ (ACS Reagent grade), and 33.0 g/L NaCl (ACS Reagent grade). The product doses were 600 ppm, 1800 ppm, 3000 ppm, and 4200 ppm based on % active. The testing was carried out in a water bath set at 160° F. (71° C.) for 24 hours. After the 24 hours, the samples were removed from the water bath and let to cool at room temperature for no less than 2 hours. A 1 mL aliquot was removed from the test samples and the calcium concentration determined by ICP spectroscopy. The results of the test are shown in Table 5.

TABLE 5

| PRODUCT | 600 ppm | 1800 ppm | 3600 ppm | 4200 ppm |
|---|---|---|---|---|
| PRODUCT 7 | 1040 ppm [Ca] | 1357 ppm [Ca] | 1900 ppm [Ca] | 1710 ppm [Ca] |
| PRODUCT 8 | 1486 ppm [Ca] | 1807 ppm [Ca] | 1240 ppm [Ca] | 1826 ppm [Ca] |
| PRODUCT 9 | 1178 ppm [Ca] | 1126 ppm [Ca] | 1513 ppm [Ca] | 2018 ppm [Ca] |
| PRODUCT 10 | 1467 ppm [Ca] | 1910 ppm [Ca] | 1920 ppm [Ca] | 1836 ppm [Ca] |

Blank (before precipitation) 1656 ppm [Ca]
Blank (after precipitation) 1015 ppm [Ca]

As seen in the results in Table 5, gluconate provides a positive synergistic affect when combined with lactic acid or citric acid for the inhibition of calcium carbonate scale.

ADDITIONAL DISCLOSURE

A first aspect which is a composition for efficient metal chelation comprising (i) a primary chelant; (ii) a coordination enhancing additive; and (iii) a solvent.

A second aspect which is the composition of the first aspect wherein the primary chelant comprises aldonic acid, uronic acid, aldaric acid, a salt thereof, a derivative thereof, or a combination thereof.

A third aspect which is the composition of any of the first through second aspects wherein the primary chelant comprises glucose, dextrose, fructose, sucrose, galactose, lactose, maltose, ribose, inositol, trehalose, xylose, or a combination thereof.

A fourth aspect which is the composition of any of the first through third aspects wherein the primary chelant comprises sodium gluconate, a glucarate, an oxidation product of sodium glucarate, gluconate, one or more derivatives thereof, or a combination thereof.

A fifth aspect which is the composition of any of the first through fourth aspects wherein the primary chelant is present at a purity of equal to or greater than about 90%.

A sixth aspect which is the composition of any of the first through fifth aspects wherein the primary chelant is present in an amount ranging from about 1 wt. % to about 50 wt. % based on the total weight of the composition.

A seventh aspect which is the composition of any of the first through sixth aspects wherein the coordination enhancing additive comprises a carbodiimide, an amine, a guanidine, a sulfonate, a hydroxyl group, a hydroxy sulfonic acid, a phenate, an ester, an amides, a phosphorus acid, an alkyl phenol, a carboxylic acid, or a combination thereof.

An eighth aspect which is the composition of any of the first through seventh aspects wherein the coordination enhancing additive is present in an amount of from about 1 wt. % to about 50 wt. % based on the total weight of the composition.

A ninth aspect which is the composition of any of the first through eighth aspects, wherein the coordination enhancing additive and primary chelant are components of a reaction product.

A tenth aspect which is the composition of the ninth aspect, wherein the reaction product comprises oxidation products of a sugar feedstock.

An eleventh aspect which is the composition of the tenth aspect wherein the oxidation products of a sugar feedstock comprise gluconate, tartaric, glucaric, glyceric, glucuronic, 2-keto-D-gluconic acid, 5-keto-D-gluconic acid, oxalic, tartronic acid, glycolic, carbon monoxide, carbon dioxide, pentaric acid, arabinic acid, guluronic acid and glucarate anions with minor component species of n-keto-acids and $C_2$-$C_5$ diacids, a salt thereof, a derivative thereof, or a combination thereof.

A twelfth aspect which is the composition of any of the first through eleventh aspects wherein the solvent comprises water, methanol, ethanol, isopropanol, ethylene glycol, propylene glycol, hydrocarbon such as xylene, or a combination thereof.

A thirteenth aspect which is the composition of any of the first through twelfth aspects, further comprising an oxidizer selected from the group consisting of hydrogen peroxide, peracetic acid, chlorine dioxide, perpropionic acid, sodium hypochlorite, and a combination thereof.

A fourteenth aspect which is the composition of the thirteenth aspects, wherein the oxidizer is present in an amount of from about 1 wt. % to about 50 wt. % based on the weight of the composition.

A fifteenth aspect which is the composition of any of the first through fourteenth aspects further comprising a surfactant selected from the group consisting of zwitterionic surfactants, cationic surfactants, anionic surfactants, nonionic surfactants, alkyl amine oxides, alkyl betaines, alkyl amidopropyl betaine, alkyl sulfobetaines, alkyl sultaines, dihydroxyl alkyl glycinate, alkyl ampho acetate, phospholipids, alkyl aminopropionic acids, alkyl imino monopropionic acids, alkyl imino dipropionic acids, laurylamidopropyl betaine, decyl betaine, dodecyl betaine, lecithin, phosphatidyl choline, stearyltrimethylammonium chloride, cetyltrimethylammonium tosylate, cetyltrimethylammonium chloride, cetyltrimethylammonium bromide, myristyltrimethylammonium chloride, myristyltrimethylammonium bromide, dodecyltrimethylammonium chloride, dodecyltrimethylammonium bromide, decyltrimethylammonium chloride, decyltrimethylammonium bromide, octyltrimethylammonium chloride, erucyl bis-(hydroxy ethyl)methylammonium chloride, erucyltrimethylammonium chloride, sodium oleate, sodium stearate, sodium dodecylbenzenesulfonate, sodium myristate, sodium laurate, sodium decanoate, sodium caprylate, sodium cetyl sulfate, sodium myristyl sulfate, sodium lauryl sulfate, sodium decyl sulfate, sodium octyl sulfate, linear alcohol ethoxylates, polyoxyethylene alkylphenol ethoxylates, polyoxyethylene alcohol ethoxylates, polyoxyethylene esters of fatty acids, polyoxyethylene mercaptans, polyoxyethylene alkylamines, polyol ester surfactants, and a combination thereof.

A sixteenth aspect which is the composition of the fifteenth aspect wherein the surfactant is present in an amount of from about 0.2 wt. % to about 10 wt. % based on the weight of the composition.

A seventeenth aspect which is a wellbore servicing fluid comprising (i) a primary chelant; (ii) a coordination enhancing additive; and (iii) a solvent.

An eighteenth aspect which is the fluid of the seventeenth aspect, wherein the primary chelant comprises aldonic acid, uronic acid, aldaric acid, a salt thereof, a derivative thereof, or a combination thereof.

A nineteenth aspect which is the fluid of any of the seventeenth through eighteenth aspects, wherein the primary chelant comprises glucose, dextrose, fructose, sucrose, galactose, lactose, maltose, ribose, inositol, trehalose, xylose, or a combination thereof.

A twentieth aspect which is the fluid of any of the seventeenth through nineteenth aspects wherein the primary chelant comprises sodium gluconate, a glucarate, an oxidation product of sodium glucarate, gluconate, a derivative thereof, or a combination thereof.

A twenty-first aspect which is the fluid of any of the seventeenth through twentieth aspects wherein the coordination enhancing additive comprises a carbodiimide, an amine, a guanidine, a sulfonate, a hydroxyl group, a hydroxy sulfonic acid, a phenate, an ester, an amide, a phosphorus acid, an alkyl phenol, a carboxylic acid, or a combination thereof.

A twenty-second aspect which is the fluid of any of the seventeenth through twenty-first aspects wherein the wellbore servicing fluid comprises a drilling fluid, a workover fluid, a stimulation fluid, or a completion fluid.

While aspects of the presently disclosed subject matter have been shown and described, modifications thereof can be made by one skilled in the art without departing from the spirit and teachings of the subject matter. The aspects described herein are exemplary only and are not intended to be limiting. Many variations and modifications of the subject matter disclosed herein are possible and are within the scope of the disclosed subject matter. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an aspect of the present disclosure. Thus, the claims are a further description and are an addition to the aspects of the present invention. The discussion of a reference herein is not an admission that it is prior art to the presently disclosed subject matter, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A composition for efficient metal chelation comprising:
a primary chelant, wherein the primary chelant comprises gluconic acid, a gluconate, glucaric acid, a glucarate, a salt thereof, or a combination thereof, wherein the primary chelant is present in an amount ranging from about 10 wt. % to about 25 wt. % based on the total weight of the composition;
a coordination enhancing additive, wherein the coordination enhancing additive comprises a hydroxy sulfonic acid, wherein the hydroxy sulfonic acid is present in an amount of from about 10 wt. % to about 25 wt. % based on the total weight of the composition;
a secondary chelant, wherein the secondary chelant comprises lactic acid, citric acid, or both lactic acid and citric acid; and
a solvent.

2. The composition of claim 1, wherein the primary chelant is present at a purity of equal to or greater than about 90%.

3. The composition of claim 1, wherein the coordination enhancing additive and primary chelant are components of a reaction product.

4. The composition of claim 3, wherein the reaction product comprises oxidation products of a sugar feedstock.

5. The method composition of claim 4, wherein the oxidation products of a sugar feedstock comprise gluconate, tartaric, glucaric, glyceric, glucuronic, 2-keto-D-gluconic acid, 5-keto-D-gluconic acid, oxalic, tartronic acid, glycolic, carbon monoxide, carbon dioxide, pentaric acid, arabinic acid, guluronic acid and glucarate anions with minor component species of n-keto-acids and $C_2$-$C_5$ diacids, a salt thereof, a derivative thereof, or a combination thereof.

6. The composition of claim 1, wherein the solvent comprises water, methanol, ethanol, isopropanol, ethylene glycol, propylene glycol, hydrocarbon such as xylene, or a combination thereof.

7. The composition of claim 1, further comprising an oxidizer selected from the group consisting of hydrogen peroxide, peracetic acid, chlorine dioxide, perpropionic acid, sodium hypochlorite, and a combination thereof.

8. The composition of claim 7, wherein the oxidizer is present in an amount of from about 1 wt. % to about 50 wt. % based on the weight of the composition.

9. The composition of claim 1, further comprising a surfactant selected from the group consisting of zwitterionic surfactants, cationic surfactants, anionic surfactants, non-ionic surfactants, alkyl amine oxides, alkyl betaines, alkyl amidopropyl betaine, alkyl sulfobetaines, alkyl sultaines, dihydroxyl alkyl glycinate, alkyl ampho acetate, phospholipids, alkyl aminopropionic acids, alkyl imino monopropionic acids, alkyl imino dipropionic acids, laurylamidopropyl betaine, decyl betaine, dodecyl betaine, lecithin, phosphatidyl choline, stearyltrimethylammonium chloride, cetyltrimethylammonium, tosylate, cetyltrimethylammonium chloride, cetyltrimethylammonium, bromide, myristyltrimethylammonium chloride, myristyltrimethylammonium, bromide, dodecyltrimethylammonium chloride, dodecyltrimethylammonium bromide, decyltrimethylammonium chloride, decyltrimethylammonium bromide, octyltrimethylammonium chloride, erucyl bis-(hydroxy ethyl) methylammonium chloride, erucyltrimethylammonium chloride, sodium oleate, sodium stearate, sodium dodecylbenzenesulfonate, sodium myristate, sodium laurate, sodium decanoate, sodium caprylate, sodium cetyl sulfate, sodium myristyl sulfate, sodium lauryl sulfate, sodium decyl sulfate, sodium octyl sulfate, linear alcohol ethoxylates, polyoxyethylene alkylphenol ethoxylates, polyoxyethylene alcohol ethoxylates, polyoxyethylene esters of fatty acids, polyoxyethylene mercaptans, polyoxyethylene alkylamines, polyol ester surfactants, and a combination thereof.

10. The composition of claim 9, wherein the surfactant is present in an amount of from about 0.2 wt. % to about 10 wt. % based on the weight of the composition.

11. The composition of claim 1, wherein the primary chelant is present in an amount ranging from about 15 wt. % to about 20 wt. % based on the total weight of the composition, and wherein the hydroxy sulfonic acid is present in an amount of from about 15 wt. % to about 20 wt. % based on the total weight of the composition.

12. The composition of claim 1, wherein the coordination enhancing additive further comprises a carboxylic acid.

13. The composition of claim 1, wherein the primary chelant comprises each of (i) the gluconic acid, the gluconate, or the salt thereof and (ii) the glucaric acid, the glucarate, or the salt thereof.

14. The composition of claim 1, wherein the secondary chelant comprises lactic acid.

15. The composition of claim 1, wherein the secondary chelant comprises citric acid.

16. A wellbore servicing fluid comprising:
a primary chelant, wherein the primary chelant comprises gluconic acid, a gluconate, glucaric acid, a glucarate, a salt thereof, or a combination thereof, wherein the primary chelant is present in an amount ranging from about 10 wt. % to about 25 wt. % based on the total weight of the composition;
a coordination enhancing additive, wherein the coordination enhancing additive comprises a hydroxy sulfonic acid, wherein the hydroxy sulfonic acid is present in an amount of from about 10 wt. % to about 25 wt. % based on the total weight of the composition;
a secondary chelant, wherein the secondary chelant comprises lactic acid, citric acid, or both lactic acid and citric acid; and
a solvent.

17. The fluid of claim 16, wherein the wellbore servicing fluid comprises a drilling fluid, a workover fluid, a stimulation fluid, or a completion fluid.

18. The fluid of claim 16, wherein the primary chelant is present in an amount ranging from about 15 wt. % to about 20 wt. % based on the total weight of the composition, and wherein the hydroxy sulfonic acid is present in an amount of from about 15 wt. % to about 20 wt. % based on the total weight of the composition.

19. The fluid of claim 16, wherein the coordination enhancing additive further comprises a carboxylic acid.

20. The composition of claim 16, wherein the primary chelant comprises each of (i) the gluconic acid, the gluconate, or the salt thereof and (ii) the glucaric acid, the glucarate, or the salt thereof.

21. The fluid of claim 16, wherein the secondary chelant comprises lactic acid.

22. The fluid of claim 16, wherein the secondary chelant comprises citric acid.

* * * * *